(12) United States Patent
Huang

(10) Patent No.: US 9,075,180 B2
(45) Date of Patent: Jul. 7, 2015

(54) LIGHT GUIDE PLATE AND MANUFACTURING METHOD THEREOF AND BACKLIGHT MODULE USING SAME

(75) Inventor: Jianfa Huang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 161 days.

(21) Appl. No.: 13/579,280

(22) PCT Filed: Jun. 20, 2012

(86) PCT No.: PCT/CN2012/077203
§ 371 (c)(1),
(2), (4) Date: Aug. 15, 2012

(87) PCT Pub. No.: WO2013/185369
PCT Pub. Date: Dec. 19, 2013

(65) Prior Publication Data
US 2013/0329458 A1 Dec. 12, 2013

(30) Foreign Application Priority Data
Jun. 12, 2012 (CN) .......................... 2012 1 0192795

(51) Int. Cl.
*F21V 8/00* (2006.01)
*B23P 17/00* (2006.01)
*F21V 7/04* (2006.01)

(52) U.S. Cl.
CPC ........... *G02B 6/0065* (2013.01); *Y10T 29/4998* (2015.01); *Y10T 29/49837* (2015.01); *G02B 6/0018* (2013.01); *G02B 6/0068* (2013.01); *G02B 6/0078* (2013.01)

(58) Field of Classification Search
None
See application file for complete search history.

(56) References Cited

U.S. PATENT DOCUMENTS

| 2008/0030650 | A1* | 2/2008 | Kitagawa et al. | 349/65 |
| 2008/0297695 | A1* | 12/2008 | Sekiguchi et al. | 349/65 |
| 2010/0214508 | A1* | 8/2010 | Ouchi et al. | 349/64 |
| 2011/0013416 | A1* | 1/2011 | Kim et al. | 362/606 |

FOREIGN PATENT DOCUMENTS

| CN | 1570676 A | | 1/2005 | |
| JP | 2001-210122 A | | 8/2001 | |
| JP | 2001210122 A | * | 8/2001 | ............ F21V 8/00 |

* cited by examiner

*Primary Examiner* — Elmito Breval
(74) *Attorney, Agent, or Firm* — Cheng-Ju Chiang

(57) ABSTRACT

The present invention provides a light guide plate and a manufacturing method thereof and a side-edge backlight module using the light guide plate. The light guide plate includes a plurality of reflective separation walls arranged therein. The reflective separation walls divide the light guide plate into a plurality of sections. The reflective separation walls have surfaces forming mirror surfaces. The light guide plate includes reflective separation walls respectively arranged between independent sections to have light traveling from an independent section toward the reflective separation wall reflected back into the independent section and thus confined within the independent section. Thus, brightness sectioning and independent control of sectionalized brightness of the light guide plate can be realized and improved light isolation result can be achieved. With such a method, manufacturing a light guide plate comprising reflective separation walls is easy, has improved yield rate, is mass producible, and is of low cost.

4 Claims, 5 Drawing Sheets

LIGHT GUIDE PLATE AND MANUFACTURING METHOD THEREOF AND BACKLIGHT MODULE USING SAME

BACKGROUND OF THE INVENTION

1. Field of the Invention

The present invention relates to the field of backlight module of liquid crystal display, and in particular to a design of a light guide plate of a side-edge backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a back panel to be located rearward of one side of the liquid crystal panel. The LED light bar emits light that enters a light guide plate (LGP) through a light incident face of the light guide plate and is projected out through a light exit face of the light guide plate, after being reflected and diffused, to thereby transmit through an optic film assembly and form a planar light source for the liquid crystal display panel.

Brightness sectioning and independent control of the backlighting of a backlight module is the basis of various techniques, such as local dimming, scanning 3D, improvement of dynamic contrast, and power saving. In a traditional side-edge backlight module, light dispersion caused by the light guide plate makes the results of these techniques of local dimming, scanning 3D, improvement of dynamic contrast, and power saving poor. To overcome such a problem, the light guide plate is designed in such a way that the light guide plate is formed with microstructures thereon. However, the conventional microstructure-carried light guide plate is deficient in showing poor light isolation and poor yield, being poor for mass production, and suffering severe warping and deformation after absorbing humidity. In addition, the cost is higher than regular light guide plate by at least 25%.

SUMMARY OF THE INVENTION

An object of the present invention is to provide a light guide plate, which realizes brightness sectioning and independent control of sectional brightness for light guide plate and shows improved light isolation.

Another object of the present invention is to provide a method for manufacturing a light guide plate, which manufactures a light guide plate featuring brightness sectioning and independent control of sectional brightness and is easy, has high yield rate, is mass producible, and is of low cost.

A further object of the present invention is to provide a side-edge backlight module, which realizes brightness sectioning and independent control of sectional brightness for backlight module and may provide improved light isolation with reduced cost.

To achieve the above objects, the present invention provides a light guide plate, comprising a plurality of reflective separation walls arranged therein. The reflective separation walls divide the light guide plate into a plurality of sections. The reflective separation walls have surfaces forming mirror surfaces.

The reflective separation walls have a width that is less than thickness of the light guide plate. The reflective separation walls have a thickness of 0.2 mm-1 mm.

The reflective separation walls are each a metal plate having surfaces that are subjected to polishing to form the mirror surfaces.

The reflective separation walls are each a metal plate having surfaces that are coated with high reflectivity layers to form the mirror surfaces.

The high reflectivity layers are made of silver or aluminum.

The present invention also provides a method for manufacturing a light guide plate, which comprises the following steps:

(1) providing a metal plate base material;

(2) subjecting surfaces of the metal plate base material to polishing or coating of high reflectivity layers to form mirror surfaces;

(3) cutting the metal plate base material into metal plates;

(4) providing a light guide plate base material;

(5) employing a heating device to heat the metal plates to a temperature higher than a melting point of the light guide plate base material; and (6) piercing the metal plates into the light guide plate base material at predetermined border lines of sections to thereby form a light guide plate comprising reflective separation walls.

In the above step (2), the high reflectivity layers are made of silver or aluminum. The metal plate base material has a thickness of 0.2 mm-1 mm. The metal plates have a width less than thickness of the light guide plate.

The present invention also provides a method for manufacturing a light guide plate, which comprises the following steps:

(1) providing a metal plate base material;

(2) subjecting surfaces of the metal plate base material to polishing or coating of high reflectivity layers to form mirror surfaces;

(3) cutting the metal plate base material into metal plates, the metal plates having a width less than thickness of the light guide plate;

(4) providing a light guide plate injection mold and a liquid light guide plate raw material;

(5) placing and fixing the metal plates in the light guide plate injection mold at locations corresponding to predetermined border lines of sections of light guide plate; and (6) injecting the liquid light guide plate raw material into the light guide plate injection mold, followed by cooling and thus shaping, to form a light guide plate comprising reflective separation walls.

In the above step (2), the high reflectivity layers are made of silver or aluminum. The metal plate base material has a thickness of 0.2 mm-1 mm.

The present invention also provides a side-edge backlight module, which comprises: a backplane, a backlight source arranged inside the backplane, a light guide plate arranged inside the backplane to correspond to the backlight source, a reflector plate disposed on an undersurface of the light guide plate, and an optic film assembly disposed on a top surface of the light guide plate. The light guide plate comprises a plurality of reflective separation walls arranged therein. The reflective separation walls divide the light guide plate into a plurality of sections. The reflective separation walls have surfaces forming mirror surfaces.

The efficacy of the present invention is that the present invention provides a light guide plate and manufacturing method thereof and a side-edge backlight module using the light guide plate. The light guide plate comprises reflective separation walls respectively arranged between independent sections to have light traveling from an independent section toward the reflective separation wall reflected back into the independent section and thus confined within the independent section. Thus, brightness sectioning and independent control of sectionalized brightness of the light guide plate can be realized and improved light isolation result can be achieved. With such a method, manufacturing a light guide plate comprising reflective separation walls is easy, has improved yield rate, is mass producible, and is of low cost. The side-edge backlight module uses the light guide plate so as to realize brightness sectioning and independent control of sectionalized brightness of the side-edge backlight module to achieve improved light isolation with reduced cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
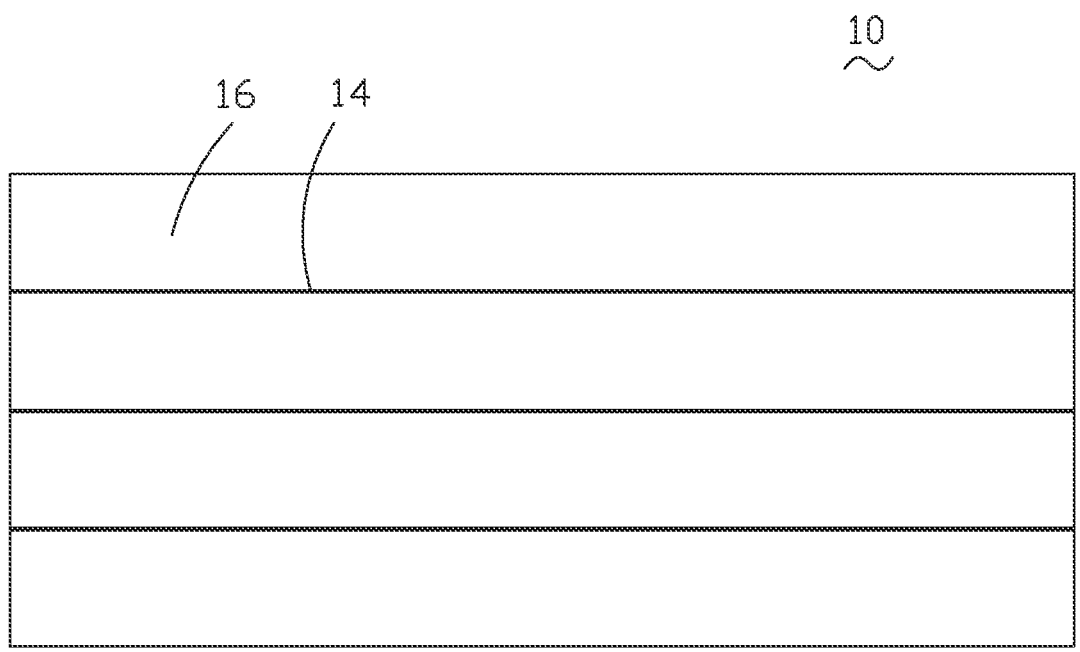
FIG. 1 is a top plan view showing a light guide plate according to the present invention.
Figure 2:
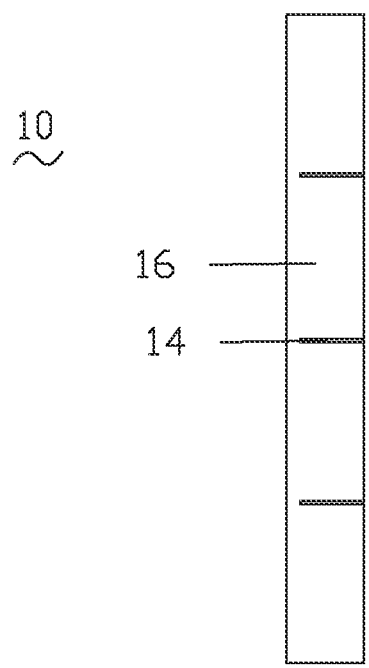
FIG. 2 is a left side elevational view of FIG. 1.
Figure 3:
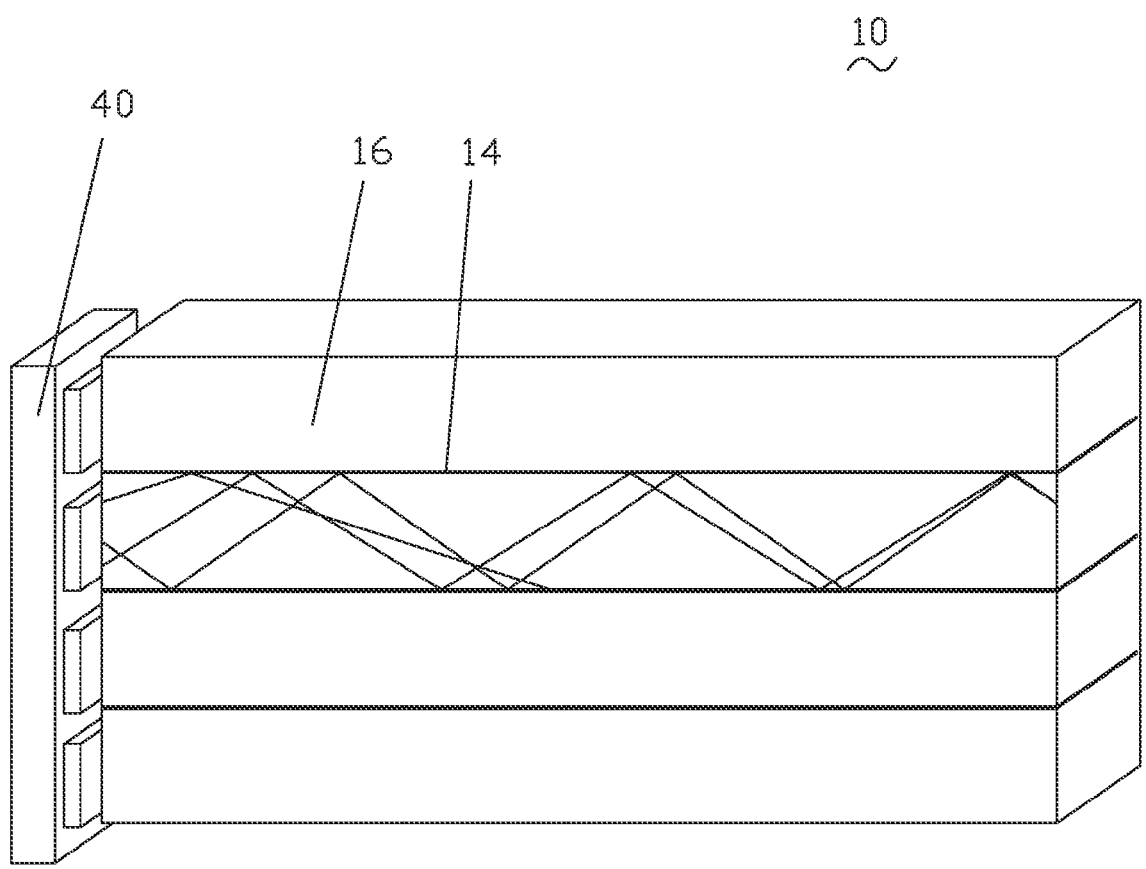
FIG. 3 is a schematic view illustrating light propagation in a section of the light guide plate according to the present invention.

Referring to FIG. 1-3, the present invention provides a light guide plate 10, in which a plurality of reflective separation walls 14 is arranged. The reflective separation walls 14 divide the light guide plate 10 into a plurality of sections 16. The number of the reflective separation walls 14 is determined according to the desired number of sections 16.

The reflective separation walls 14 have a width that is less than thickness of the light guide plate 10. The reflective separation walls 14 are of a form of thin plate having surfaces forming mirror surfaces. The reflective separation walls 14 are metal plates, which have a thickness of 0.2 mm-1 mm. In the instant embodiment, the metal plates are subjected to surface polishing to form the mirror surfaces, whereby the metal plates are of high reflectivity for visible light so as to reflect light from a backlight source 4 and traveling through a section 16 toward one of the reflective separation walls 14 back into the section 16, preventing the light from affecting adjacent sections 16. Thus, sectionalization of the light guide plate 10 in respect of brightness can be realized and independent control of the sectional brightness of the sections 16 can be achieved to thus provide improved light isolation result.

An optional alternative embodiment, the metal plate has surfaces on which high reflectivity layers are coated to form the mirror surfaces. The high reflectivity layer shows a reflectivity of 98% for visible light. The high reflectivity layer can be made of a metal, such as silver and aluminum. The high reflectivity layer may reflect light that travels from one section 16 toward the reflective separation wall 14 back into the section 16, preventing the light from affecting adjacent sections 16. Thus, sectionalization of the light guide plate 10 in respect of brightness can be realized and independent control of the sectional brightness of the sections 16 can be achieved to thus provide improved light isolation result.

Figure 4:
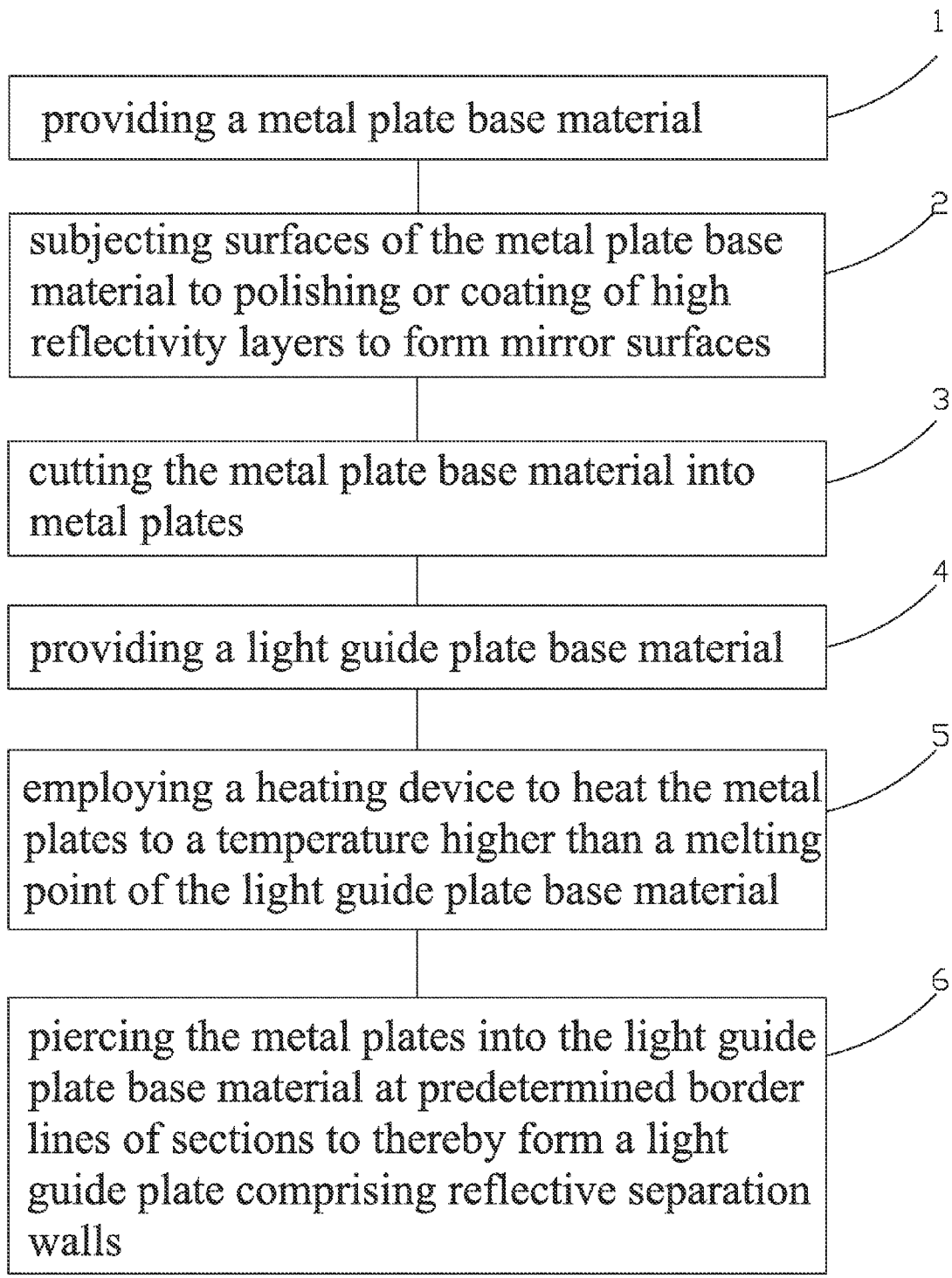
FIG. 4 is a flow chart illustrating a manufacturing method of a light guide plate according to the present invention.

Referring to FIGS. 1 and 4, the present invention also provides a method for manufacturing a light guide plate, which comprises the following steps:

Step 1: providing a metal plate base material.

The metal plate base material has a thickness of 0.2 mm-1 mm.

Step 2: subjecting surfaces of the metal plate base material to polishing or coating of high reflectivity layers to form mirror surfaces.

The high reflectivity layer has a reflectivity of 98% for visible light. The high reflectivity layer can be made of a metal, such as silver and aluminum.

Step 3: cutting the metal plate base material into metal plates.

The metal plates have a width less than thickness of the light guide plate.

Step 4: providing a light guide plate base material, which can be a conventional non-injection-molded light guide plate.

Step 5: employing a heating device to heat the metal plates to a temperature higher than a melting point of the light guide plate base material.

Step 6: piercing the metal plates into the light guide plate base material at predetermined border lines of sections to thereby form a light guide plate 10 comprising reflective separation walls 14.

The above described method for manufacturing a light guide plate 10 comprising reflective separation walls 14 is easy, has high yield rate, is mass producible, and has relatively low cost.

Figure 5:
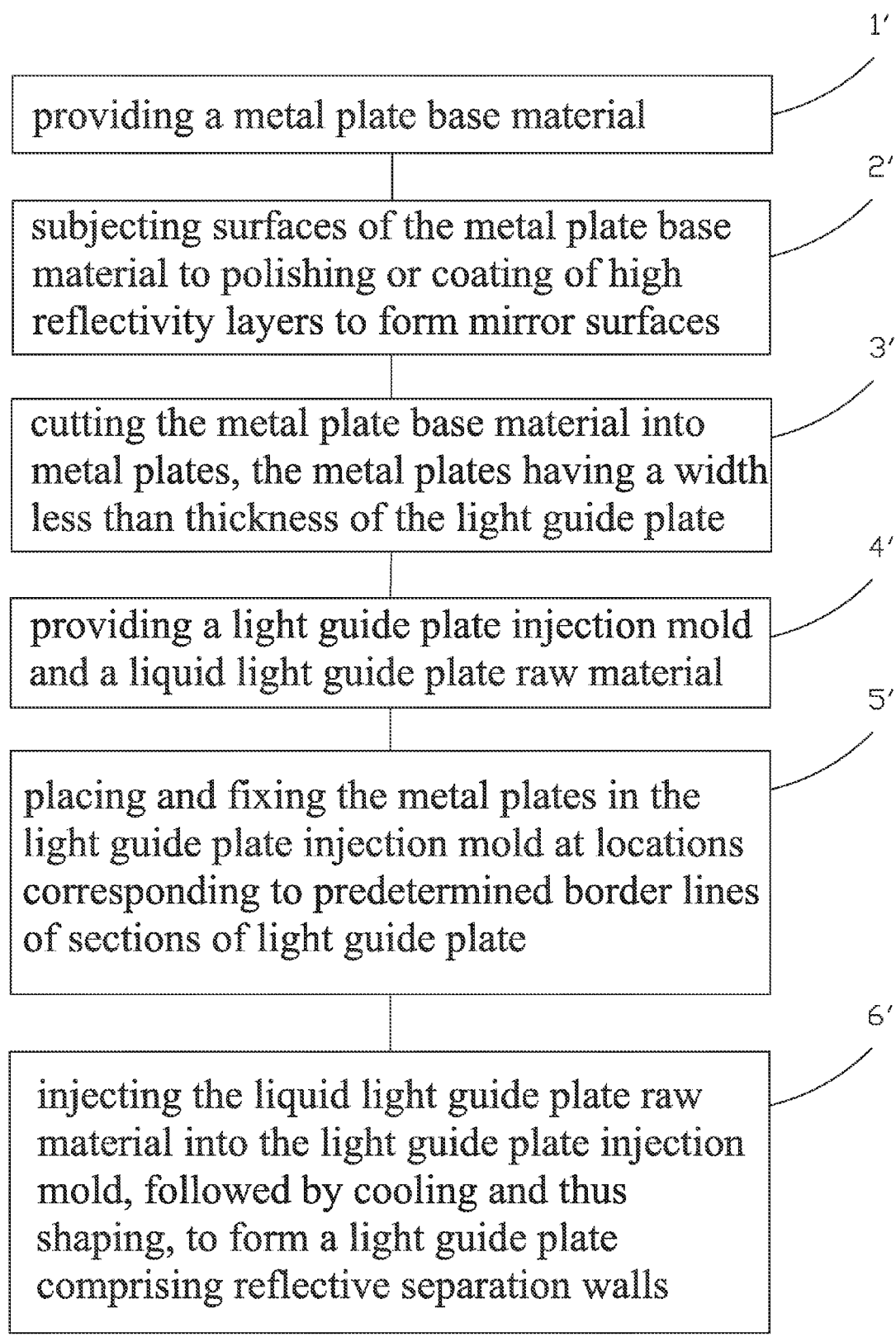
FIG. 5 is a flow chart illustrating another manufacturing method of a light guide plate according to the present invention.

Referring to FIGS. 1 and 5, the present invention also provides another method for manufacturing a light guide plate, which comprises the following steps:

Step 1': providing a metal plate base material.

The metal plate base material has a thickness of 0.2 mm-1 mm.

Step 2': subjecting surfaces of the metal plate base material to polishing or coating of high reflectivity layers to form mirror surfaces.

The high reflectivity layer has a reflectivity of 98% for visible light. The high reflectivity layer can be made of a metal, such as silver and aluminum.

Step 3': cutting the metal plate base material into metal plates.

The metal plates have a width less than thickness of the light guide plate.

Step 4': providing a light guide plate injection mold and a liquid light guide plate raw material.

Step 5': placing and fixing the metal plates in the light guide plate injection mold at locations corresponding to predetermined border lines of sections of light guide plate.

Step 6': injecting the liquid light guide plate raw material into the light guide plate injection mold, followed by cooling and thus shaping, to form a light guide plate 10 comprising reflective separation walls 14.

Figure 6:
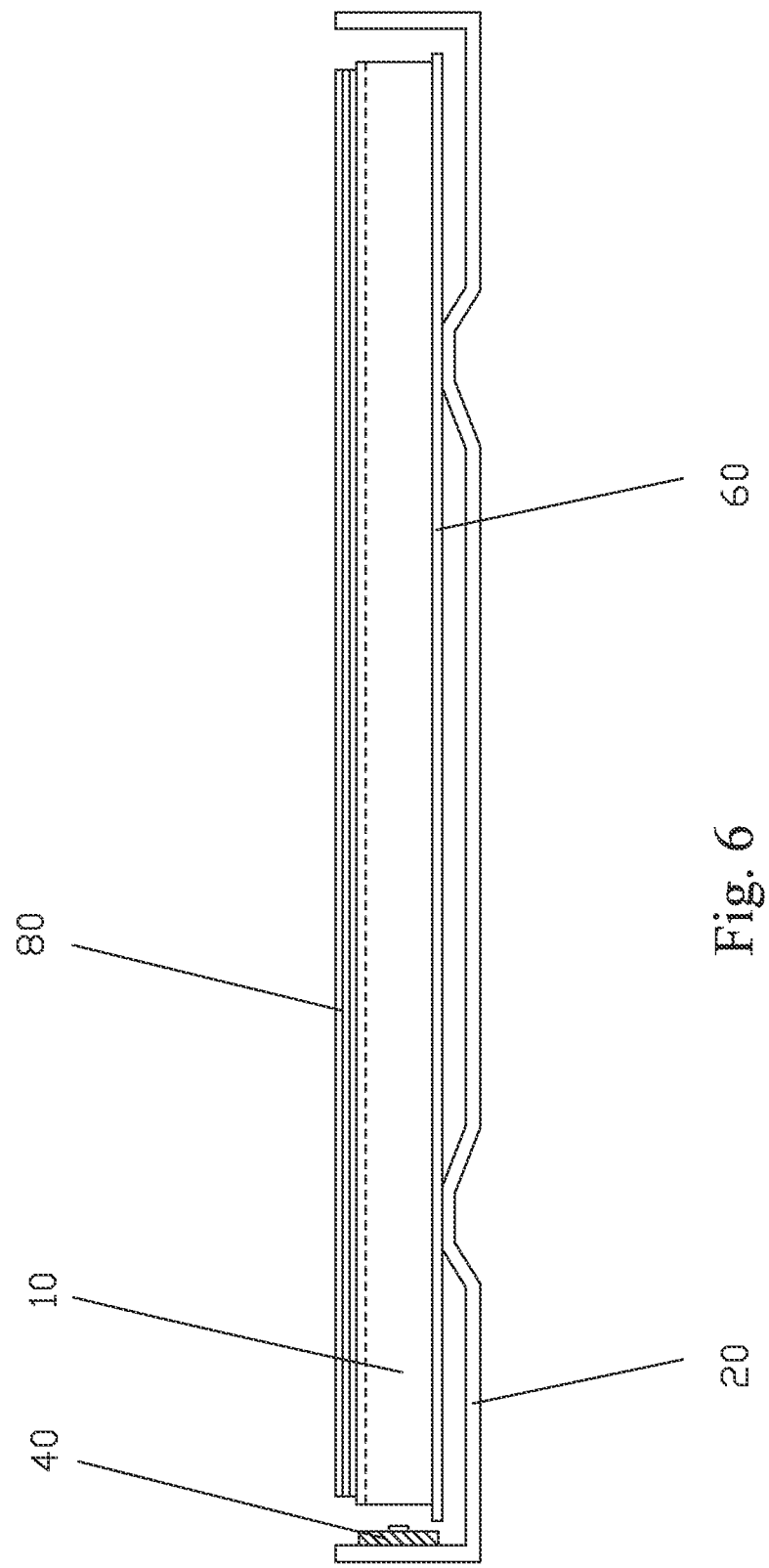
FIG. 6 is a schematic view showing a side-edge backlight module according to the present invention.

Referring to FIGS. 1 and 6, the present invention also provides a side-edge backlight module, which comprises a backplane 20, a backlight source 40 arranged inside the backplane 20, a light guide plate 10 arranged inside the backplane 20 to correspond to the backlight source 40, a reflector plate 60 disposed on an undersurface of the light guide plate 10, and an optic film assembly 80 disposed on a top surface of the light guide plate 10. The light guide plate 10 comprises a plurality of reflective separation walls 14 arranged therein and the reflective separation walls 14 divide the light guide plate 10 into a plurality of sections 16. The reflective separation walls 14 each have surfaces forming mirror surfaces. The side-edge backlight module according to the present invention uses the above described light guide plate 10 so as to realize brightness sectioning and independent control of sectionalized brightness and thus achieve improved light isolation with reduced cost.

In summary, the present invention provides a light guide plate and manufacturing method thereof and a side-edge backlight module using the light guide plate. The light guide plate comprises reflective separation walls respectively arranged between independent sections to have light traveling from an independent section toward the reflective separation wall reflected back into the independent section and thus confined within the independent section. Thus, brightness sectioning and independent control of sectionalized brightness of the light guide plate can be realized and improved light isolation result can be achieved. With such a method, manufacturing a light guide plate comprising reflective separation walls is easy, has improved yield rate, is mass producible, and is of low cost. The side-edge backlight module uses the light guide plate so as to realize brightness sectioning and independent control of sectionalized brightness of the side-edge backlight module to achieve improved light isolation with reduced cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a light guide plate, comprising the following steps:
   (1) providing a metal plate base material;
   (2) subjecting surfaces of the metal plate base material to polishing or coating of high reflectivity layers to form mirror surfaces;
   (3) cutting the metal plate base material into metal plates;
   (4) providing a light guide plate base material that is different from the metal plate base material;
   (5) employing a heating device to heat the metal plates to a temperature higher than a melting point of the light guide plate base material; and
   (6) piercing the heated metal plates into the light guide plate base material at predetermined border lines of sections by means of the temperature of the metal plates to thereby form a light guide plate comprising reflective separation walls formed of the metal plates that are pierced into the light guide plate and have mirror surfaces, wherein a width of the metal plates that is measured in a direction parallel to a thickness of the light guide plate is less than the thickness of the light guide plate so as to have the metal plates completely buried in the light guide plate.

2. The method for manufacturing a light guide plate as claimed in claim 1, wherein in step (2), the high reflectivity layers are made of silver or aluminum, the metal plate base material having a thickness of 0.2 mm-1 mm measured in a direction normal to the width thereof.

3. A method for manufacturing a light guide plate, comprising the following steps:
   (1) providing a metal plate base material;
   (2) subjecting surfaces of the metal plate base material to polishing or coating of high reflectivity layers to form mirror surfaces;
   (3) cutting the metal plate base material into metal plates, the metal plates having a width less than thickness of the light guide plate;
   (4) providing a light guide plate injection mold and a liquid light guide plate raw material;
   (5) placing and fixing the metal plates in the light guide plate injection mold at locations corresponding to predetermined border lines of sections of light guide plate; and
   (6) injecting the liquid light guide plate raw material into the light guide plate injection mold, followed by cooling and thus shaping, to form a light guide plate comprising reflective separation walls formed of the metal plates that are molded in the light plate and have mirror surfaces, wherein a width of the metal plates that is measured in a direction parallel to a thickness of the light guide plate is less than the thickness of the light guide plate so as to have the metal plates completely buried in the light guide plate.

4. The method for manufacturing a light guide plate as claimed in claim 3, wherein in step (2), the high reflectivity layers are made of silver or aluminum, the metal plate base material having a thickness of 0.2 mm-1 mm measured in a direction normal to the width thereof.

* * * * *